United States Patent
Yasuda et al.

(10) Patent No.: US 7,134,718 B2
(45) Date of Patent: Nov. 14, 2006

(54) VEHICLE SEAT

(75) Inventors: Eiichi Yasuda, Owariasahi (JP);
Shunichi Doi, Nagoya (JP); Katsuya Ibaraki, Ama-gun (JP); Etsunori Fujita, Hiroshima (JP); Yumi Ogura, Hiroshima (JP); Seiji Kawasaki, Hiroshima (JP)

(73) Assignees: Kabushiki Kaisha Toyota Chuo Kenkyusho, Aichi-gun (JP); Delta Tooling Co., Ltd., Hiroshima (JP)

( * ) Notice: Subject to any disclaimer, the term of this patent is extended or adjusted under 35 U.S.C. 154(b) by 132 days.

(21) Appl. No.: 10/422,765

(22) Filed: Apr. 25, 2003

(65) Prior Publication Data

US 2003/0201659 A1 Oct. 30, 2003

(30) Foreign Application Priority Data

Apr. 26, 2002 (JP) ............................. 2002-127297

(51) Int. Cl.
*B60N 2/42* (2006.01)
(52) U.S. Cl. ............ 297/216.13; 297/472; 297/452.56; 297/218.1; 297/216.15
(58) Field of Classification Search ........... 297/452.56, 297/216.14, 218.1, 472, 216.15, 216.13
See application file for complete search history.

(56) References Cited

U.S. PATENT DOCUMENTS

| | | | | |
|---|---|---|---|---|
| 5,013,089 A | * | 5/1991 | Abu-Isa et al. | 297/452.64 |
| 5,393,126 A | * | 2/1995 | Boulva | 297/452.56 |
| 5,669,661 A | * | 9/1997 | Pajon | 297/216.13 |
| 6,302,487 B1 | * | 10/2001 | Fujita et al. | 297/452.56 |
| 6,378,949 B1 | * | 4/2002 | Maeda et al. | 297/452.56 |
| 6,390,549 B1 | * | 5/2002 | Mayer et al. | 297/216.14 |
| 6,435,618 B1 | * | 8/2002 | Kawasaki | 297/452.56 |
| 6,478,381 B1 | * | 11/2002 | Cramb et al. | 297/452.13 |
| 6,485,103 B1 | * | 11/2002 | Yamada et al. | 297/452.56 |
| 6,817,674 B1 | * | 11/2004 | Fujita et al. | 297/452.48 |

FOREIGN PATENT DOCUMENTS

| | | |
|---|---|---|
| JP | 11-70029 | 3/1999 |
| JP | 2003-135199 | 5/2003 |

* cited by examiner

*Primary Examiner*—Laurie K. Cranmer
(74) *Attorney, Agent, or Firm*—Oblon, Spivak, McClelland, Maier & Neustadt, P.C.

(57) ABSTRACT

An upper end portion of a seat backrest and a lower end portion of a head rest are superposed together. A rear end portion of an upper portion cushion member and a lower end portion of the seat backrest are superposed together. These superposed portions are sewn together by thin threads which break when pressing force of a predetermined value or greater is applied to the seat backrest. Thus, when pressing force of the predetermined value or greater is applied to the seat backrest, the thin threads break. A portion of the seat backrest which a shoulder portion of a seated occupant contacts, and a portion of the seat backrest which buttocks of the seated occupant contact, are enlarged, and impact force can be damped.

13 Claims, 7 Drawing Sheets

FIG.1A MODEL OF SEATED HUMAN BODY

FIG.1B EQUIVALENT SYSTEM MODEL

MODEL OF HUMAN BODY AT TIME OF COLLISION

FIG.2A

VIBRATION MODEL OF URETHANE SEAT AND HUMAN BODY

THREE-DIMENSIONAL KNITTED FABRIC

SEC.A-A

FIG.6B

SEC.B-B
PART IV

FIG.6C

SEC.B-B
PART III

FIG.6D

SEC.B-B
PART I

FIG.6E

SEC.B-B
PART II

FIG.7A

DAMPING WAVEFORM OF CONVENTIONAL NET SEAT

FIG.7B

DAMPING WAVEFORM OF NET SEAT OF PRESENT INVENTION

COMPARISON OF DAMPING CHARACTERISTICS OF CONVENTIONAL NET SEAT AND NET SEAT OF PRESENT INVENTION

VEHICLE SEAT

BACKGROUND OF THE INVENTION

1. Field of the Invention

The present invention relates to a vehicle seat, and in particular, to a vehicle seat which, by the cushion material of a seat back, absorbs impact force at the time when an automobile receives a large, forwardly-directed impact force due to a collision from the rear (hereinafter called "rear collision") or the like.

2. Description of the Related Art

When an automobile receives a large, forwardly-directed impact force due to a rear collision or the like, the impact force is absorbed by the seat backrest which is formed of urethane and has a damping characteristic. At this time, the seated occupant sinks into the seat backrest such that that seat backrest elastically deforms. Thus, the majority of the impact force temporarily accumulates in the seat back as elastic energy. The seated occupant is pushed forward by the temporarily accumulated elastic energy.

To address impact forces caused by rear collisions, Japanese Patent Application Laid-Open (JP-A) No. 11-70029 discloses a seat which absorbs impact force. The seat back of this seat has a pair of side frames which are formed at the respective outer side portions in the vehicle transverse direction and which extend vertically, and a plurality of S-shaped springs which span along the vehicle transverse direction at the vertical direction intermediate portion of the pair of side frames. Further, a lath metal mesh spans between the pair of side frames at the vertical direction intermediate portion of the pair of side frames. This lath metal mesh is provided at the rear of the S-shaped springs so as to be separated by a predetermined distance rearwardly from the S-shaped springs, and such that the longitudinal directions of the openings of the lath metal mesh are directed in the vertical direction.

When a great impact force is applied to this seat, a difference in accelerations arises between the seat and the vehicle occupant due to the inertia of the vehicle occupant, and the seat moves relatively in the advancing direction. Thus, the plurality of S-shaped springs elastically deform greatly toward the rear, and the seated occupant collides with the lath metal mesh via the S-shaped springs and a pad and the like. When the lath metal mesh receives a load in the direction of thickness thereof, it is easy for the lath metal mesh to plastically deform in the surface direction thereof. Thus, due to the reaction force which is directed rearward from the vehicle occupant and is based on the aforementioned impact force, i.e., due to the load applied to the lath metal mesh in the direction of thickness thereof, plastic deformation occurs smoothly at the lath metal mesh. In this way, the energy based on the impact force is absorbed sufficiently, and the shock applied to the seated occupant can be mitigated sufficiently.

However, in the above-described conventional seat, up until the time when the seated occupant collides with the lath metal mesh via the S-shaped springs and the pad and the like, elastic energy caused by the rear collision accumulates in the S-shaped springs and in the springs of the cushion pad of the backrest. This elastic energy becomes energy which pushes the seated occupant forward. Further, although the lath metal mesh plastically deforms in the vertical direction when the seated occupant collides with the lath metal mesh, there is little plastic deformation at the rear of the seat. Thus, the kinetic energy of the seated occupant is not absorbed by the lath metal mesh. Accordingly, a problem arises in that the load of the impact force on the seated occupant is great.

SUMMARY OF THE INVENTION

The present invention was developed in order to overcome the above-described problems, and an object of the present invention is to provide a vehicle seat which, when an automobile receives a large, forwardly-directed impact force due to a rear collision or the like, absorbs, by the cushion material of the seat back, the impact force which is applied to a seated occupant via the seat, so as to decrease the load of the impact force on the seated occupant.

In order to achieve the above-described object, the present invention provides a vehicle seat comprising a cushion material which damps impact force applied to a vehicle from a back toward a front by changing a posture of a seated occupant such that buttocks and shoulders of the seated occupant sink into the cushion material due to reaction against the impact force when applied.

In the present invention, when impact force is applied to a vehicle from the back toward the front, the buttocks and the shoulders of the seated occupant sink into the cushion material due to the reaction.

Next, description will be given of a dynamic model of a case in which impact caused by a rear collision is inputted to a human body (vehicle occupant) seated on a seat. In a rear collision, the behavior of the human body in the front-back direction and in the vertical direction are important. Thus, each region of the human body can be expressed by a concentrated mass positioned within a vertical plane which is parallel to the longitudinal direction of the vehicle. The respective regions can be expressed by the planar model shown in FIG. 1A in which these concentrated masses are joined by links. The concentrated masses are as follows: the mass of the head portion is m1, the mass of the chest portion is m2, the mass of the pelvis and waist portion is m3, and the mass of the region combining the femoral region and leg portion is m4.

Figure 1A:
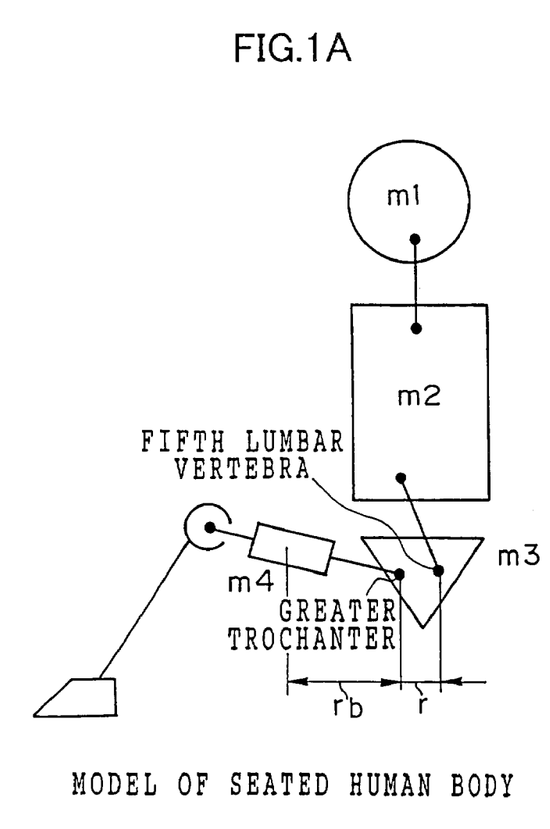
FIG. 1A is a schematic diagram showing the posture of a seated occupant before colliding with a seat of the present invention.
Figure 1B:
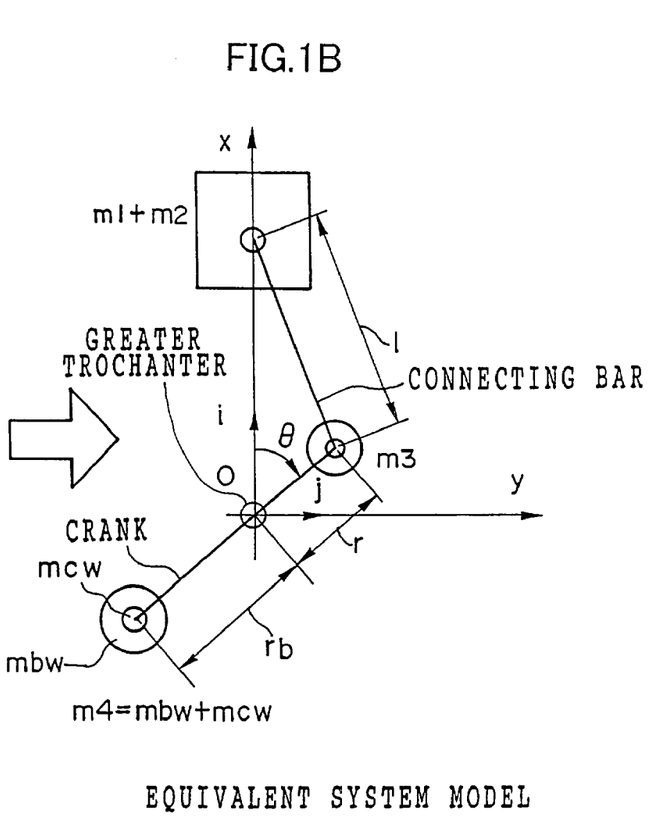
FIG. 1B is a schematic diagram showing the change in posture at the time when impact force due to the collision is applied.

Supposing that the pelvis is restrained by a seat belt at the time of a rear collision, as shown in FIG. 1B, the greater trochanter becomes the center of rotation of the upper body. The structure of FIG. 1A can be replaced by an equivalent dynamic model which is based on a piston-crank mechanism in which the portion of the mass m1+m2 corresponds to the piston. Further, a rectangular coordinate system can be supposed in which the greater trochanter is the origin O and the direction of movement of the mass m1+m2 is the x axis. The unit vectors in the directions of the x and y axes are i and j, respectively.

Next, the principles of impact absorption at the time of a rear collision will be described by using the equivalent dynamic model of FIG. 1B, on the basis of the relationships of the forces applied to the respective portions of the human body. At the time of a rear collision, at the region of mass m4 where the femoral region and the leg portion are combined, the impact force due to the rear collision generates clockwise rotational movement whose center of rotation is the greater trochanter. At this time, the following equilibrium equations (1), (2) must be established in order for the rotational movement, which is determined by the product or the like of the mass m4 (=mcw+mbw) of the region combining the femoral region and the leg portion and the distance rb from the center of gravity position of the region of mass m4 to the greater trochanter (the origin O), to achieve an equilibrium between the primary inertial force due to the mass m3 of the region combining the pelvis and the waist portion, and the inertial force due to the mass m1+m2 of the region combining the head portion and the chest portion. Here, mcw is the mass of the femoral region, and mbw is the mass of the leg portion.

$$mcw \cdot rb = m3 \cdot r \quad (1)$$

$$mbw \cdot rb = (m1+m2) \cdot r \quad (2)$$

As described above, the impact force generated by the rear collision is a trigger for the accumulation of elastic energy at the spring elements at the cushion due to the pelvis and the waist portion sinking downwardly (rearwardly). Then, the downward (rearward) sinking movement of the pelvis and the waist portion is converted into rotational movement of the region combining the femoral region and the leg portion, with the center of rotation of the rotational movement being the greater trochanter. Inertial force F, which is generated at this time at the mass m1+m2 of the region combining the head portion and the chest portion, is expressed by following equation (3) based on equation (2), given that the greater trochanter is the center of rotation.

$$F = (m1+m2) \cdot r \cdot \omega^2 \cos\theta i + mbw \cdot rb \cdot w^2 \{\cos(\pi+\theta)i + \sin(\pi+\theta)j\} = \quad (3)$$
$$-(m1+m2) \cdot r \cdot \omega^2 \sin\theta j$$

Namely, the x direction force, which pushes vertically upwardly the region combining the head portion and the chest portion, is offset by the force due to the rotational movement around the greater trochanter of the region combining the femoral region and the leg portion, and is converted into pressing force which presses the seat back. In this way, the rotational moment, which accompanies the rotational movement of the region combining the femoral region and the leg portion, is converted into pressing force which presses the primary inertial force of the region combining the head portion and the chest portion into the backrest. Therefore, the pushing-out force from the backrest can be offset.

In the case of a conventional seat, the center of rotation of the greater trochanter at the time of a collision moves in the x direction due to the reaction force of the cushion, and the damping characteristic of the backrest is small. Therefore, there is little offsetting of the pressing force from the backrest which is due to the inertial force of the region combining the head portion and the chest portion.

In contrast, in the above-described seat of the embodiment, when the impact force immediately after a rear collision exceeds a predetermined value, the buttocks of the seated occupant sink in at the rear end portion of the cushion. In this way, due to the buttocks being made to sink in at the rear end portion of the cushion, inertial force in the direction of gravity is applied to the mass m3 of the region combining the pelvis and the waist portion. An attempt is made to bring the rotational moment, which is caused by the rotational movement of the femoral region and the leg portion, into equilibrium by the rotational moment which is expressed as the product of this inertial force and the distance r from the greater trochanter which is the center of rotation. However, the rotational moment of the femoral region and the leg portion is greater than the rotational moment of the pelvis and the waist portion. Thus, the backrest pressing force increases. This increased force of pressing into the backrest is offset by the pressing force which the chest portion receives from the backrest at the time when the pelvis and the waist portion sink in downwardly (rearwardly).

Further, in the seat of the embodiment, when the pressing force of the backrest caused by a rear collision exceeds the predetermined value, the flexure increases while the reaction force of the backrest is substantially maintained as is, and a damping effect can be achieved. In this way, because it is possible to make the reaction force from the backrest small, the backrest pressing force due to the primary inertial force of the region combining the head portion and the chest portion is substantially offset.

Accordingly, as compared with a conventional seat, the seat of the embodiment can improve the pressing force applied to a vehicle occupant at the time of a rear collision.

Further, the present invention is a vehicle seat comprising a backrest formed by using a cushion material, wherein the cushion material comprises a large number of cells and a first damping element, each of the cells has a spring element which is compressed in a pressing direction of the seated occupant and which extends in a direction opposite to the pressing direction, and a second damping element damps compression and extension of the spring element; and the first damping element is added in at least one of a buttock portion which buttocks of the seated occupant contact and shoulder portion which shoulders of the seated occupant contact, due to reaction against impact force when applied to a vehicle from a back toward a front.

In accordance with the present invention, the backrest is formed from a cushion material. The cushion material comprises a large number of cells. The cells have spring elements and second damping elements which damp the compression and the extension of the spring elements. Thus, the back of the seated occupant, which can assume any of an infinite variety of S-shaped configurations, and the respective cells reliably contact one another, and the surface area of contact between the human body and the seat can be increased.

Figure 2A:
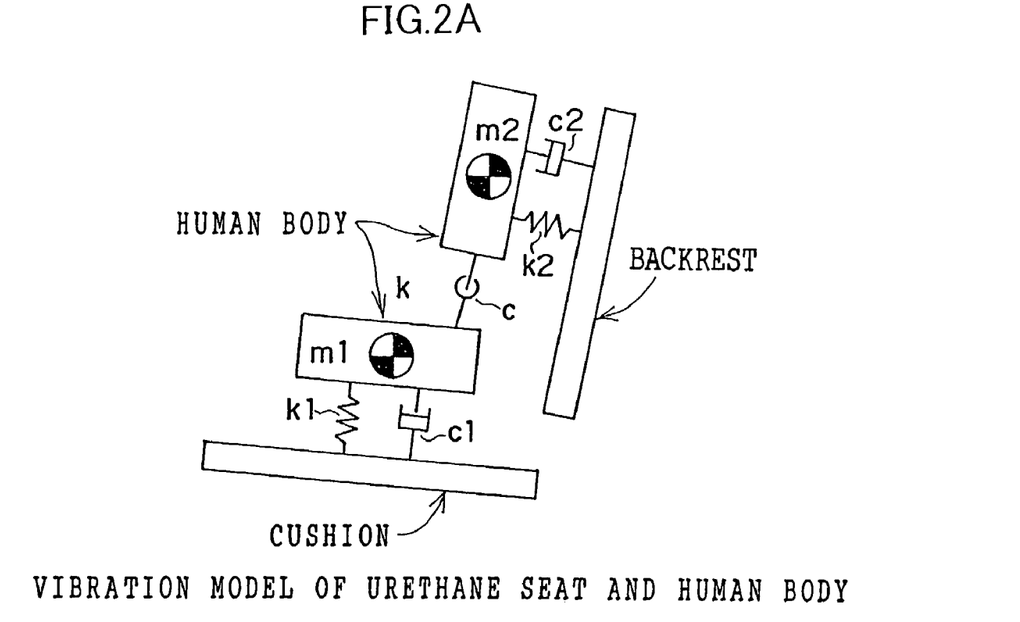
FIG. 2A is a schematic diagram showing a vibration model of a urethane seat and a human body.

On the other hand, in a conventional urethane cushion material, contact at one side arises due to the backbone and the lumbar shape of the backrest not coinciding with one another. Equivalently, as shown in FIG. 2A, the upper body mass m2 of the seated occupant is supported by the spring elements and the damping elements at the portion where there is contact only at one side.

Figure 2B:
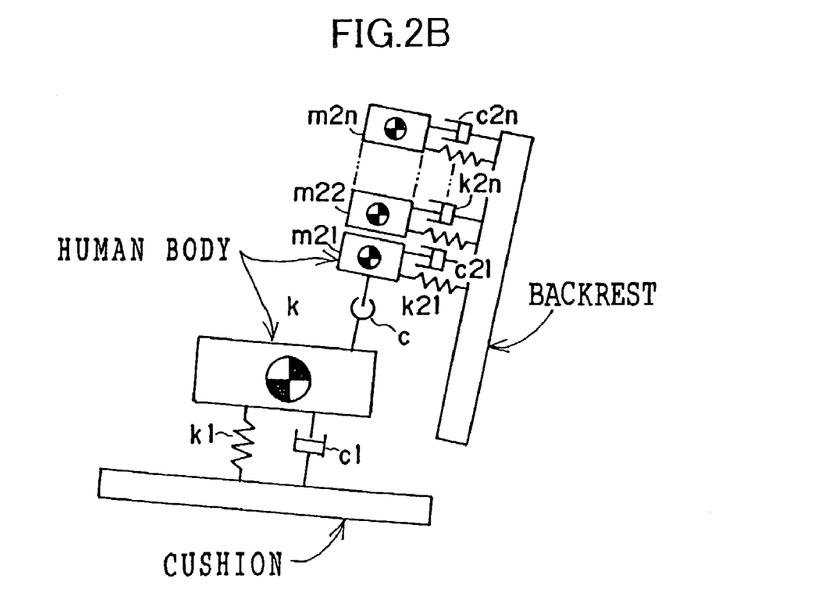
FIG. 2B is a schematic diagram showing a vibration model of a seat and a human body in accordance with weight dispersion of a backrest of the present invention.

In contrast, in the backrest of the present invention, the surface area of contact with the back of the seated occupant is increased due to the large number of cells. In this way, as shown in FIG. 2B, the upper body mass m2 of the seated occupant applied to the backrest is dispersed equivalently into respective masses (m21 through m2n). Thus, the backrest can be thought of as a cushion material having damping elements and spring elements for each mass.

Thus, the damping elements of the backrest overall are extremely large as compared with those of a conventional urethane cushion.

Moreover, the first damping mechanism is added in at least one of a buttock portion which buttocks of the seated occupant contact and shoulder portion which shoulders of the seated occupant contact, due to reaction against impact force when applied to a vehicle from a back toward a front. Therefore, the impact force is damped by the first damping element, the flying-out of the seated occupant toward the front is suppressed, and the load of the impact force on the seated occupant can be lessened.

At this time, by adding the first damping element, the damping ratio in the pressing direction of the cushion material of the backrest changes, before and after application of reaction force from the seated occupant at the time when the impact force is applied, by 0.1 or more, and preferably changes by 0.2 or more and 0.6 or less.

When, as the first damping mechanism, the flexure of the backrest is increased due to a specific reaction force from the human body at the time when the impact force is applied, it is possible to effectively mitigate the impact force inputted to the human body.

In this way, by increasing the pressing direction flexure of the cushion material of the backrest by impact or the like at the time of a rear collision, the weight characteristic with respect to the pressing direction flexure of the cushion material of the backrest can be offset in the pressing direction by an amount corresponding to the increased amount of flexure. In this way, there is hardly any change in weight with respect to the flexure of the cushion material which is offset at the time of a collision, and the spring constant k infinitely becomes zero.

Namely, because the spring constant k infinitely becomes zero, given that the upper body mass of the seated occupant applied to the backrest is m2 and that the damping coefficient which is the total of the damping elements of the respective cells of the cushion material of the backrest is ct, the damping ratio $\xi$ which is calculated by the equation $\xi=ct/(2(m2 \cdot k)^{0.5})$ approaches infinity, and the impact force at the time of a collision is absorbed.

The increase in the flexure of the cushion material at the buttocks and the shoulder portion of the seated occupant rotates the trunk rearward around the greater trochanter. Thus, the pushing-out force, which is applied in the direction normal to the seat surface and which is due to the elastic energy which could not be absorbed at the cushion material, is dispersed in the vertical direction and in the horizontal direction as shown in FIG. 1B. In this way, the forwardly-directed pushing-out force is made small, and flying-out of the seated occupant is thereby suppressed.

In this way, in the present invention, to handle the elastic energy of the cushion material itself, the S-shaped configuration of the backbone of the seated occupant and the respective cells are made to contact one another and the surface area of contact between the human body and the seat is increased by using the cushion material comprising a large number of cells and second damping element, the cells having spring elements and the second damping element which damps the compression and the extension of the spring elements. In this way, the second damping elements of the entire backrest are increased, and the energy, which presses the configuration of the back of the seated occupant out forwardly, can be greatly absorbed.

To handle the increase in the load of impact force on the seated occupant due to there being little flexure in the pressing direction at the time of a rear collision, the flexure at the time of a collision is increased. In this way, the damping ratio is increased, the load on the seated occupant is greatly reduced, and the amount of flying forward of the seated occupant at the time of a collision can be greatly suppressed by the elastic energy absorbing characteristic of the cushion material.

The flexure of the backrest can be increased by plastically deforming the backrest by the reaction at the time when the impact force is applied. When using a backrest having the three-dimensional mesh structure which will be described later, if the portion of the backrest which is to be plastically deformed is superposed by being turned over or the like and this superposed portion is semi-welded or sewed, the semi-welded portion will peel apart or the threads of the sewn portion will break when impact force is applied. Thus, the backrest can easily be plastically deformed.

A cushion material, which is not a solid body as is conventional urethane and which has a seat structure which flexibly changes with respect to the human body and which has sufficiently large damping elements, is suitable as the cushion material of the present invention.

For example, a net which is formed as a three-dimensional knitted fabric by polyethylene terephthalate threads, i.e., a cushion material having a three-dimensional mesh structure, and a cushion material in which a large number of cells having spring elements and damping elements are arranged, can be used as the cushion material. The large number of cells can be arranged in a lattice form. By stretching the cushion material onto a seat frame, it is possible to satisfy the condition of providing a seat structure which changes flexibly with respect to the human body, and the condition of making the damping elements large.

When a cushion material having a three-dimensional mesh structure is used, the following structure is possible: the vehicle seat has a seat cushion; and a seat back having a seat back frame to which the seat cushion is mounted, and a backrest having a three-dimensional mesh structure and stretched across the seat back frame, wherein the portion of the backrest contacted by the buttocks of a seated occupant and the portion of the backrest contacted by the shoulder portion of the seated occupant are superposed and are sewn together by sewing threads or semi-welded so that the sewing threads break or the semi-welded portion peels apart due to the reaction at the time when impact force is applied from the back toward the front, and the flexure at the portion of the backrest contacted by the buttocks of the seated occupant and the portion of the backrest contacted by the shoulder portion of the seated occupant is increased by the reaction at the time when the impact force is applied from the back toward the front.

Further, the backrest having the three-dimensional mesh structure can be stretched across the seat back frame such that the backrest extends more easily in the heightwise direction of the seat back than in the transverse direction of the seat back.

By stretching the backrest over the seat back frame in this way, when impact force is applied to the vehicle from the back toward the front, the backrest extends in the heightwise direction of the seat back (i.e., in the direction along the back of the seated occupant) more than in the transverse direction of the seat back. The buttocks of the seated occupant are made to sink in, and the trunk of the seated occupant can easily be rotated backward around the greater trochanter.

When an even greater impact force is applied, the sewn threads at the sewn portion of the shoulder portion and the buttocks break, or the semi-welded portions peel apart. The portion where the cushion material having the three-dimensional mesh structure is superposed expands, and the flexure increases by an amount corresponding to the portion which had been superposed. Thus, the damping ratio $\xi$ increases, and forward flying-out of the seated occupant can be greatly suppressed.

Further, in order to increase the damping effect due to the backrest, it is effective to make the coefficient of damping of the cushion material having the three-dimensional mesh structure small in the direction in which the seated occupant sinks into the backrest, i.e., the pressing direction pressed by the back of the seated occupant, and to make the coefficient of damping large in the direction in which the backrest pushes-out forwardly, i.e., the direction opposite to the pressing direction.

DESCRIPTION OF THE PREFERRED EMBODIMENT

Hereinafter, an embodiment of a vehicle seat of the present invention will be described in detail with reference to the drawings. Note that, in the drawings and the following description, the direction of arrow F will be used to denote the front side in the longitudinal (front-back) direction of the vehicle, the direction of arrow U will be used to denote the upper (top) side in the vertical direction of the vehicle (the heightwise direction of the seats), and the direction of arrow LR will be used to denote the left-right direction of the vehicle (the transverse direction of the seats).

Figure 3:
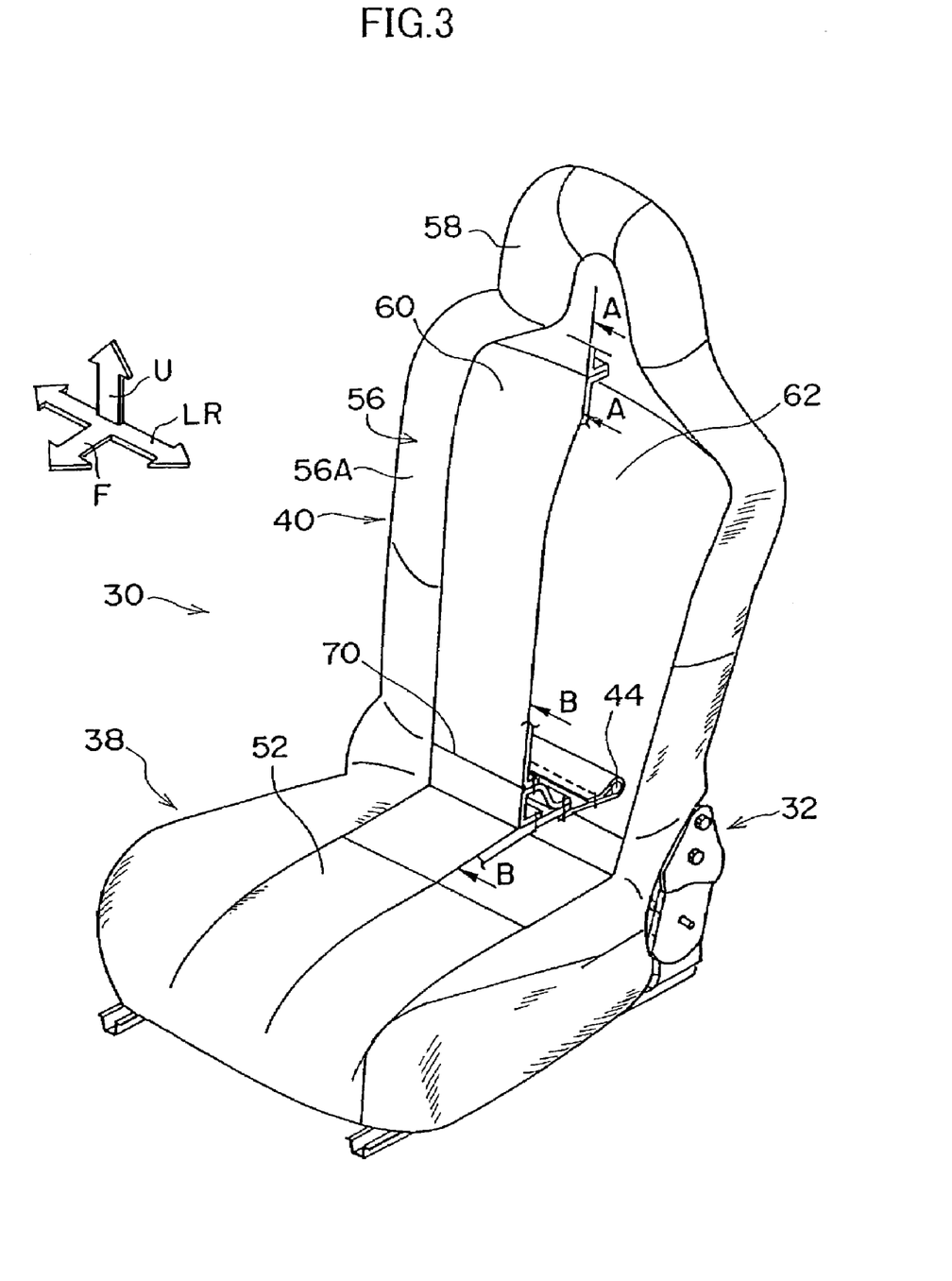
FIG. 3 is a schematic perspective view, a portion of which is removed, showing a vehicle seat of an embodiment.

As shown in FIG. 3, a vehicle seat 30 has a seat frame 32. The seat frame 32 has a frame for the seat portion and a frame for the back portion (a seat back frame). A seat cushion 38 is formed by providing a cushion material for the seat portion on the frame for the seat portion. A seat back 40 is formed by stretching, across the frame for the back portion, a seat backrest 60 which is formed from a cushion material for the back portion which has a three-dimensional mesh structure.

One end of the frame for the back portion is connected to one end of the frame for the seat portion, such that the frame for the back portion can rotate around a shaft which is disposed along the left-right direction. A reclining mechanism, which can pivot forward and rearward around the connecting portion, is formed thereby. Detailed description of this reclining mechanism is omitted.

The frame for the seat portion has a pair of side frames. The seat back cushion 38 is formed by a plurality of coil springs whose ends are supported at the side frames; a contour mat elastically supported at the coil springs; an intermediate cushion member formed by elastic members which have been laminated on the top surface of the contour mat; and an upper portion cushion member 52 which is laminated on the top surface of the intermediate cushion member and is stretched between the side frames.

Only the upper portion cushion member 52 of the seat cushion extends forward and is folded over so as to be supported by the side frames and a front end frame which spans between the side frames. In this way, the elastic compliance is increased, the damping function is improved, the impeding of blood flow is suppressed, and when the seat is used as the driver's seat, the smoothness of operation the pedals is improved. Note that elastic compliance is calculated by (amount of flexure)/(average pressure value of contacted surface).

Both the intermediate cushion member and the upper portion cushion member 52 of the seat cushion 38 are formed by a three-dimensional knitted fabric which is a seat material having a three-dimensional mesh structure which will be described later. When the vehicle occupant is seated on the seat, the intermediate cushion member suppresses the sensation of contacting the bottom which would arise if only the upper portion cushion member 52 were used, and suppresses the sensation caused by the contour mat and the coil springs of being seated on some type of object. Note that the intermediate cushion member may be formed by folding over the upper portion cushion member 52.

On the other hand, the frame for the back portion of the seat back 40 has a pair of side frames which extend in the heightwise direction of the seat. An elastic member formed of urethane or the like, a three-dimensional knitted fabric, or fabric springs are provided at the side frames. Side support portions 56, which correspond to the sides of the body of the vehicle occupant seated on the seat 30, are formed by forming the elastic member, the three-dimensional knitted fabric, or the fabric springs into predetermined configurations at the both left and right direction (transverse direction) sides of the seat back 40. A head rest 58 is provided at the top portion of the seat back 40 between the side support portions 56, and a seat backrest 60 is stretched between the side support portions 56.

Namely, the seat 30 is a bucket-type seat in which the body of the seated occupant sinks-in between the side support portions 56. Surface materials 56A, which provide the proper degree of cushioning and a pleasant tactile sensation, are adhered to the surfaces of the side support portions 56. The three-dimensional knitted fabric which will be described later is used as the surface materials 56A.

The portion of the seat back 40 between the side support portions 56 is open such that an opening 62 is formed. The seat backrest 60, which is formed by a cushion member formed from the three-dimensional woven fabric, is stretched across so as to close the opening 62.

Namely, the seat backrest 60 is formed by a cushion member which is stretched across the opening 62 which is the central portion which opposes the back of the vehicle occupant seated on the seat 30. Accordingly, the seat backrest 60 formed by a cushion member is stretched across the frame for the back portion of the seat back, via the side support portions 56.

Note that it is possible to stretch the seat backrest 60 directly across the frame for the back portion of the seat back, and not via the side support potions 56.

The lower end portion of the seat backrest 60 is connected by sewing to the rear end portion of the upper portion cushion member 52 of the seat cushion 38. By joining the lower end portion of the seat backrest 60 and the rear end portion of the upper portion cushion member 52 in this way, a seam portion 70 of a predetermined length, which extends along the transverse direction of the set, is formed at the border between the upper portion cushion member 52 and the seat backrest 60. Note that the detailed structure of this portion joined together by sewing will be described later.

In this way, in the present embodiment, a structure which supports the sides of the body of the vehicle occupant is formed by providing the side support portions 56 and by joining the upper portion cushion member 52 and the seat backrest 60 together.

Next, the three-dimensional knitted fabric used as the aforementioned cushion member will be described with reference to FIGS. 4A and 4B.

Figure 4A:
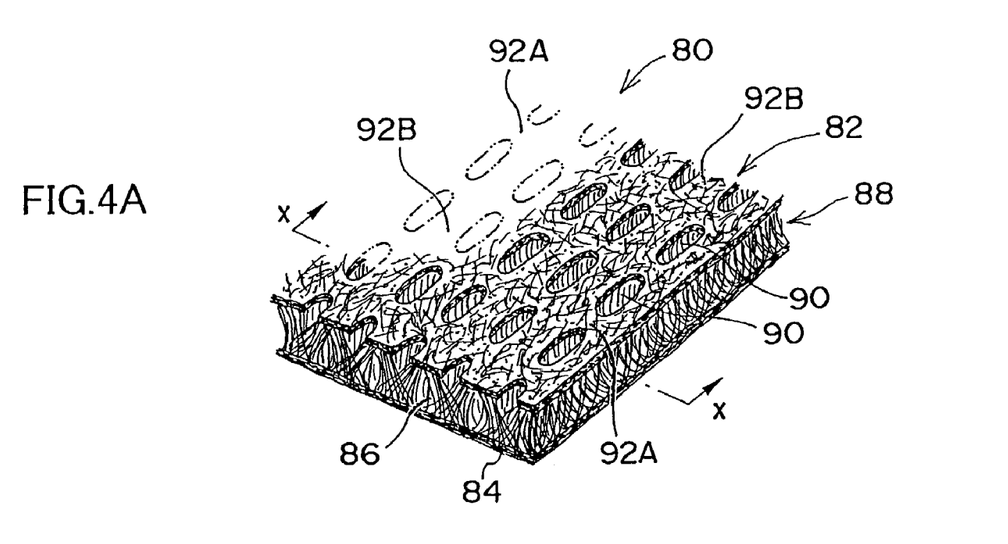
FIG. 4A is a schematic diagram showing a three-dimensional woven fabric used as a cushion member.
Figure 4B:
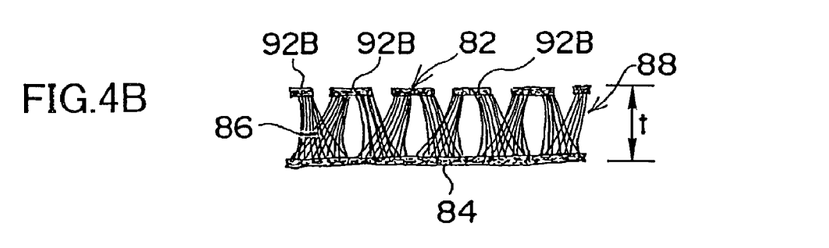
FIG. 4B is a cross-sectional view taken along line X—X of FIG. 4A.

As shown in FIGS. 4A and 4B, a three-dimensional knitted fabric 80 is structured by a pair of ground knit fabrics 82, 84 which are disposed so as to be separated from one another, and a pile portion 88 formed by a large number of connecting threads 86 which run back and forth between the pair of ground knit fabrics 82, 84 so as to join them together.

The one ground knit fabric 84 can be formed, for example, by using a fabric which forms a mesh by a flat knit fabric organization which uses threads formed by twisting short fibers and which is continuous in both the wale direction and the course direction.

The other ground knit fabric 82 can be formed, for example, by using a fabric which forms a mesh which uses threads formed by twisting short fibers, and in which a large number of flat oval holes are arranged in a lattice form and a large number of small cells 92A and a large number of large cells 92B are formed between these holes in a lattice form. Further, this other ground knit fabric 82 is knitted so as to have a larger mesh than the one ground knit fabric 84.

The cells 92A are continuous via the cells 92B in the direction of the short axis of the flat oval holes, and are separated by the flat oval holes in the direction of the long axis of the flat oval holes. Further, the cells 92B are continuous along the direction of the long axis of the flat oval holes, and are connected via the cells 92A in the direction of the short axis of the flat oval holes. The portions, of the cells 92B, which correspond to the flat oval holes are separated by the flat oval holes. Note that the ground knit fabrics 82, 84 are not limited to a fine organization or a honeycomb form, and knit fabric organizations of other mesh forms can be used.

As shown in FIGS. 4A and 4B, the connecting threads 86 are woven in between the ground knit fabric 84 and the cells 92A, 92B of the ground knit fabric 82, such that a predetermined interval t is maintained between the one ground knit fabric 84 and the cells 92A, 92B of the other ground knit fabric 82. The connecting threads 86 thereby form the pile portion 88. In this way, a predetermined rigidity is imparted to the three-dimensional knitted fabric 80 which is mesh-knit.

Due to this pile portion 88, a spring element, which is compressed in the pressing direction pressed by the back of the seated occupant and which extends in the direction opposite to this pressing force, and a damping element, which damps the compression and extension of the spring element, are provided at each of the large number of cells 92A, 92B.

Further, the large cells 92B are continuous in the direction of the long axis of the flat oval holes, and are locally separated by the holes in the direction of the short axis of the holes. Thus, it is difficult for the cells 92B to extend in the long axis direction of the flat oval holes, and easy for the cells 92B to extend in the short axis direction of the flat oval holes.

The three-dimensional knitted fabric 80 can provide the needed stiffness, depending on the thickness of the ground threads forming the ground knit fabrics 82, 84, and the like. However, it is preferable that the ground threads be chosen from a range which does not make the knitting operation difficult. Further, monofilament threads can be used as the ground threads. Multifilament threads or spun threads may be used in consideration of the feel, the softness of the surface tactile sensation, and the like.

Monofilament threads are preferably used as the connecting threads 86, and their thickness is preferably in the range of 167 decitex to 1100 decitex. With multifilament threads, a cushioning ability having a good restoring force can be obtained. If the thickness is less than 167 decitex, the stiffness of the three-dimensional knitted fabric 80 deteriorates. If the thickness exceeds 1100 decitex, the three-dimensional knitted fabric 80 will be too hard and the proper cushioning ability cannot be achieved.

Namely, by using monofilament threads of 167 decitex to 1100 decitex as the connecting threads 86, the load of the vehicle occupant seated on the seat can be supported by the deformation of the meshes forming the ground knit fabrics 82, 84, the deformation caused by the collapsing or buckling of the connecting threads 86 forming the pile portion 88, and the restoring forces of the adjacent connecting threads which impart a spring characteristic to the deformed connecting threads 86. A soft structure, which has a soft spring characteristic and in which stress does not concentrate, can be obtained.

Recesses and projections may be formed at the three-dimensional knitted fabric 80. Namely, the ground knit fabrics 82, 84 may be fabrics which are knit such that recesses and projections are formed at the surfaces thereof. When such recesses and projections are formed, spring elements which have substantially arch-shaped cross-sections can be formed at the ground knit fabrics 82, 84. Thus, a soft spring characteristic can be imparted, and a structure having an elastic compliance which is equivalent to or greater than that that of muscles can easily be formed.

The materials of the ground threads and the connecting threads 86 are not particularly limited. Examples thereof are synthetic fibers and regenerated fibers such as polypropylene, polyester, polyamide, polyacrylonitrile, rayon, and the like, as well as natural fibers such as wool, silk, cotton, and the like. A single type of these materials may be used, or plural types thereof may be used together in arbitrary combinations. Preferably, thermoplastic polyester fibers such as polyethylene terephthalate (PET), polybutylene terephthalate (PBT) and the like, and polyolefin fibers such as nylon 6, nylon 66 and the like, and combinations of two or more types of these fibers, are used.

Moreover, the thread configurations of the ground threads and the connecting threads 86 are not limited to those described above, and threads having circular cross-sections, threads having differently shaped cross-sections, or the like may be used.

The cushion member 52 and the like using the three-dimensional knitted fabric 80 have low springability, a high damping ratio, and easily deform so as to conform to the form of the body of the vehicle occupant, thereby achieving a better fit to the body of the vehicle occupant. The cushion member of the seat back 40 and the both transverse direction end portions of the upper portion cushion member 52 of the seat cushion 38 are made integral by the three-dimensional knitted fabrics 80 thereof being sewn together. The region opposing the portion of the body of the vehicle occupant from his/her buttocks to his/her lumbar vertebrae portion, which is where a great load is applied when the vehicle occupant is seated, is supported in a hammock-like manner such that the body of the vehicle occupant is raised up from the buttocks to the lumbar vertebrae portion. In this way, it is easy for the vehicle seat to follow changes in the posture of the vehicle occupant, and the sensation of sitting is improved.

Figure 5:
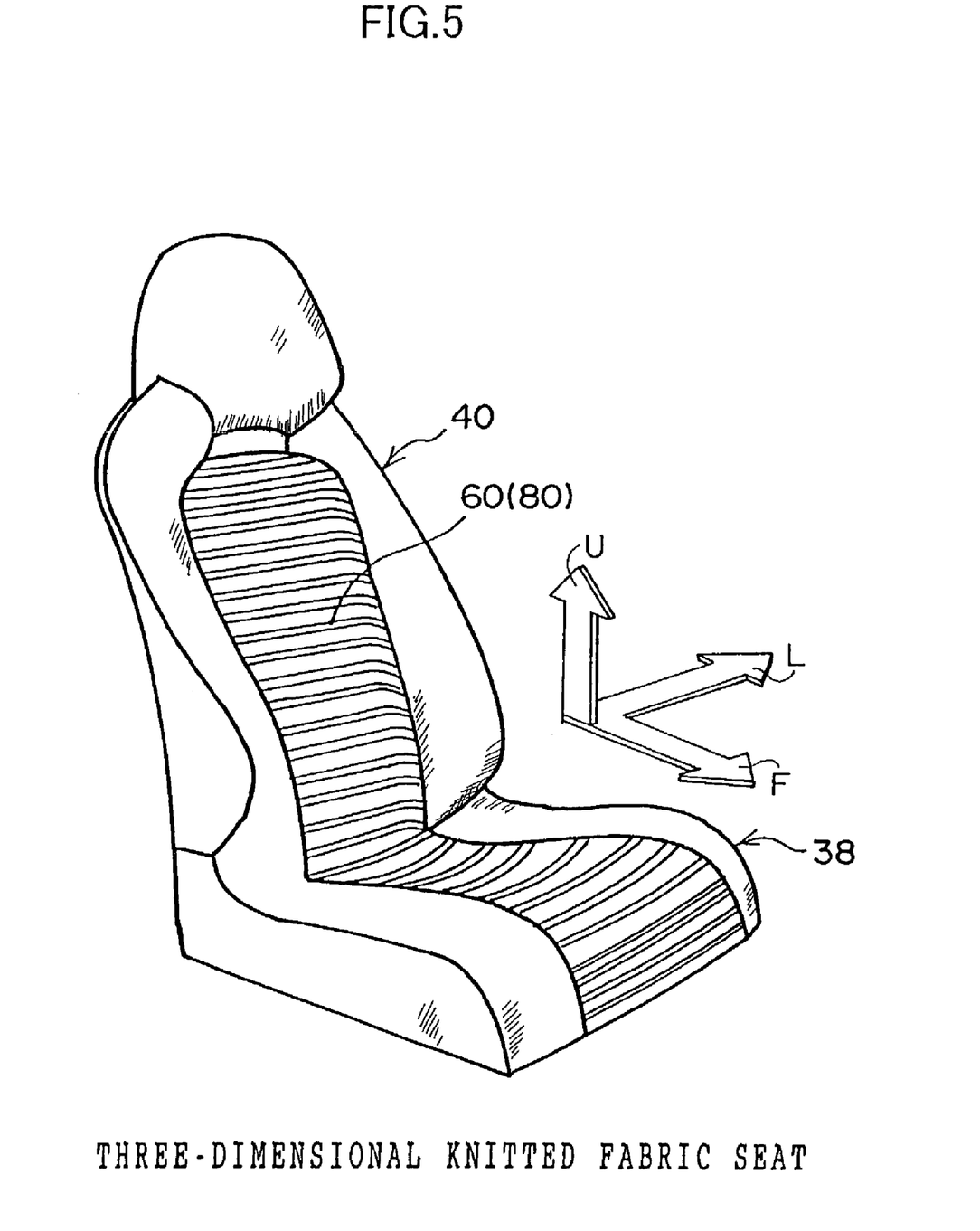
FIG. 5 is a perspective view of a three-dimensional knitted fabric seat of the embodiment.

As shown in FIG. 5, the three-dimensional knitted fabric 80, which is stretched across the seat back 40 as the cushion member of the seat backrest 60, is stretched out such that the direction of the long axis of the flat oval holes coincides with the transverse direction of the seat backrest 60, i.e., such that the cells 92B are continuous along the transverse direction of the seat backrest 60. Further, the three-dimensional knitted fabric 80, which is stretched across as the upper portion cushion member 52 of the seat cushion 38, is stretched across such that the direction of the long axis of the flat oval holes coincides with the transverse direction of the seat cushion 28, i.e., such that the cells 92B are continuous along the transverse direction of the seat cushion 38.

Accordingly, the three-dimensional knitted fabric 80 is stretched across the frame for the back portion such that it can extend more easily in the heightwise direction of the seat back than in the transverse direction of the seat back, and is stretched across the frame for the seat portion such that it can extend more easily in the longitudinal (front-back) direction of the seat cushion than in the transverse direction of the seat cushion.

Further, the three-dimensional knitted fabric fixed to the seat frame is stretched out to an elongation percentage of 5% or less. However, the degree of stretching of the three-dimensional knitted fabric at the backrest can be continuously changed within this range of elongation percentages in accordance with the shape of the buttocks of the human body and the S-shaped configuration of the back of the human body.

Note that, in the above description, the three-dimensional knitted fabric is used in the seat cushion as well. However, a conventional urethane cushion can be used as the seat cushion.

Next, the structure of the portions of the seat back which the shoulder portion and the buttocks contact will be described. The portion of the backrest of the present embodiment which the shoulder portion of the seated occupant contacts, and the portion of the backrest of the present embodiment which the buttocks of the seated occupant contact, plastically deform due to thin sewn threads breaking due to the pressing force (reaction force) from the seated occupant at the time when impact force is applied to the vehicle from the rear toward the front. Due to this plastic deformation, the flexure of the backrest is increased. This plastic deformation is preferably set such that the damping ratio of the cushion material of the backrest before and after pressing force is applied from the seated occupant at the time when impact force is applied changes by 0.1 or more, and preferably changes by 0.2 or more and 0.6 or less. If the amount of change in the damping ratio is less than 0.2, elastic energy will accumulate and the seated occupant will be pushed forward which is not preferable. If the amount of change in the damping ratio exceeds 0.6, the amount of movement of the vehicle occupant toward the rear of the backrest at the time when impact force is applied increases, and the vehicle occupants seated in the rear seats will be affected, which is not preferable.

Figure 6A:
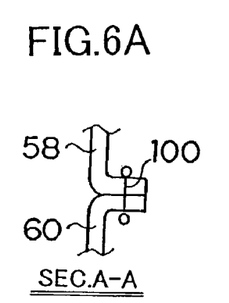
FIG. 6A is a cross-sectional view taken along line A—A of FIG. 3.

As shown in FIG. 3 and FIG. 6A, the upper end portion of the seat backrest 60 and the lower end portion of the head rest 58 are superposed, and this superposed portion is sewn together by thin threads 100 which break when pressing force of a predetermined value or more is applied to the seat backrest 60. Thus, when a pressing force of the predetermined value or more is applied to the seat backrest 60 from the seated occupant, the thin threads 100 break, and the portion of the seat backrest 60 which the shoulder portion of the vehicle occupant contacts is enlarged. The strength of the thin threads is determined in accordance with the magnitude of the impact force which is to be damped.

Figure 6B:
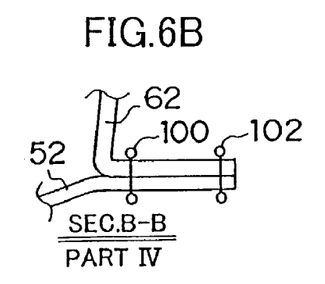
FIG. 6B is a cross-sectional view taken along line B—B of FIG. 3.

As shown in FIG. 3 and FIG. 6B, the rear end portion of the upper portion cushion member 52 and the lower end portion of the seat backrest 60 are superposed, and this superposed portion is sewn together by thick threads 102 which do not break when pressing force of the predetermined value or more is applied to the seat backrest 60. A portion of this superposed portion, which portion is at a position which is further toward the seated occupant and is separated by a predetermined distance from the portion sewn together by the thick threads 102, is sewn together by the thin threads 100. Thus, when a pressing force of the predetermined value or more is applied to the seat backrest 60, the thin threads 100 break. The portion of the seat backrest 60 which the buttocks of the seated occupant contact, is enlarged up to the portion where the thick threads 102 are sewn, and the upper portion cushion member 52 moves downward.

In this way, when the thin threads of the portion which the shoulder portion contacts and the portion which the buttocks contact break due to the pressing force from the seated occupant due to the reaction at the time when impact force is applied to the vehicle from the rear toward the front, the portion which the shoulder portion contacts and the portion which the buttocks contact plastically deform and the flexure is increased. The seated occupant is pivoted backward around his/her greater trochanter, and as shown in FIGS. 1A and 1B, the impact force is damped, and the load of the impact force on the seated occupant can be decreased.

Next, examples of other structures of the portion of the seat back which the buttocks contact will be described. The examples shown in FIGS. 6C, 6D, and 6E are structures in which, by interposing and sewing a connecting member 104 between the rear end portion of the upper portion cushion member 52 and the lower end portion of the seat backrest 60, the rear end portion of the upper portion cushion member 52 and the lower end portion of the seat backrest 60 are connected by the connecting member 104.

Figure 6C:
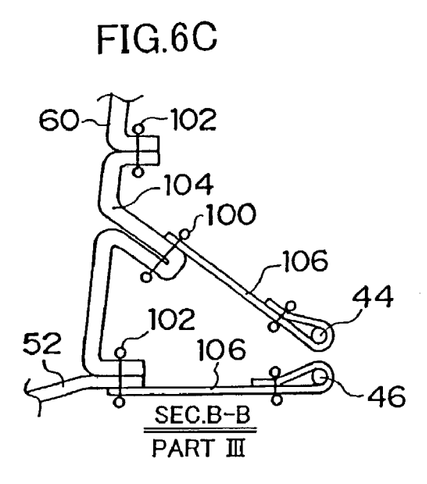
FIGS. 6C through 6E are respectively cross-sectional views taken along line B—B of FIG. 3 in different modes.

The connecting member 104 of FIG. 6C is connected to the rear end portion of the upper portion cushion member 52 and the lower end portion of the seat backrest 60, by the upper end portion and the lower end portion of the connecting member 104 being sewn thereto by the thick threads 102 which do not break even if pressing force of the predetermined value or greater is applied to the seat backrest 60. The central portion of the connecting member 104 is folded over and superposed one portion on another, so as to project toward the inner side of the seat back. This superposed portion is supported at a shaft 44, which spans between the seat frames, by a supporting member 106 which is sewn to the superposed portion by the thin threads 100.

Further, the sewn-together portion of the upper portion cushion member 52 and the connecting member 104 is supported by another shaft 46, which spans between the seat frames, by another supporting member 106 which is sewn by the thick threads 102 to the sewn-together portion. In this case as well, when impact of the predetermined value or more is applied to the seat backrest 60, the threads 100 break such that the folded-over portion of the connecting member expands. Thus, the portion of the seat backrest 60 contactted by the buttocks of the seated occupant expands.

Figure 6D:
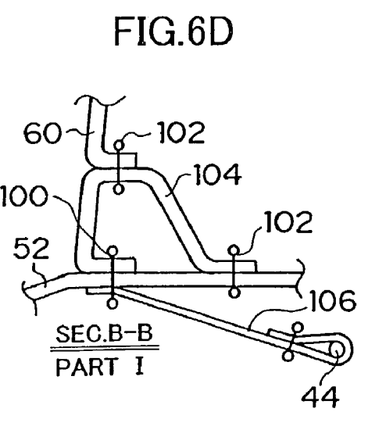
Figure 6E:
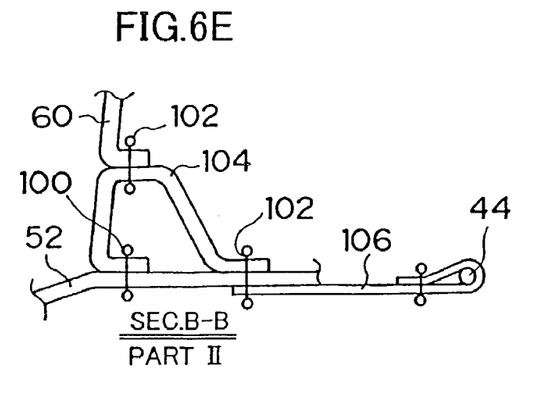

FIG. 6D illustrates a structure in which the lower end portion of the seat backrest 60 is sewn to the intermediate portion of the connecting member 104 by the thick threads 102. The lower end portion of the connecting member 104 is sewn, by the thin threads 100, to one end portion of the supporting member 106 and to the rear end portion side of the upper portion cushion member 52. The other lower end portion of the connecting member 104 is sewn, by the thick threads 102, to the rear end portion side of the upper portion cushion member 52 at a position which is further rearward than the portion of the upper end portion of the connecting member 104 sewn by the thin threads 100. The portion sewn by using the thin threads 100 is supported at the shaft 44 by the supporting member 106.

FIG. 6E shows a structure which is substantially the same as that of FIG. 6D. The point that is different from the structure of FIG. 6D is that one end of the supporting member 106 is, together with the upper portion cushion member 52 and the connecting member 104, sewn by the thick threads 102 to the sewn together portion where the upper portion cushion member 52 and the connecting member 104 are sewn together by the thick threads 102. The portion sewn together by the thick threads 102 is supported at the shaft 44 by the supporting member 106.

In this case as well, when pressing force of the predetermined value or more is applied to the seat backrest 60, the thin threads 100 break, and the other end portion of the connecting member separates from the upper portion cushion member 52. Thus, the portion of the seat backrest 60 which the buttocks of the seated occupant contact is enlarged.

Figure 7A:
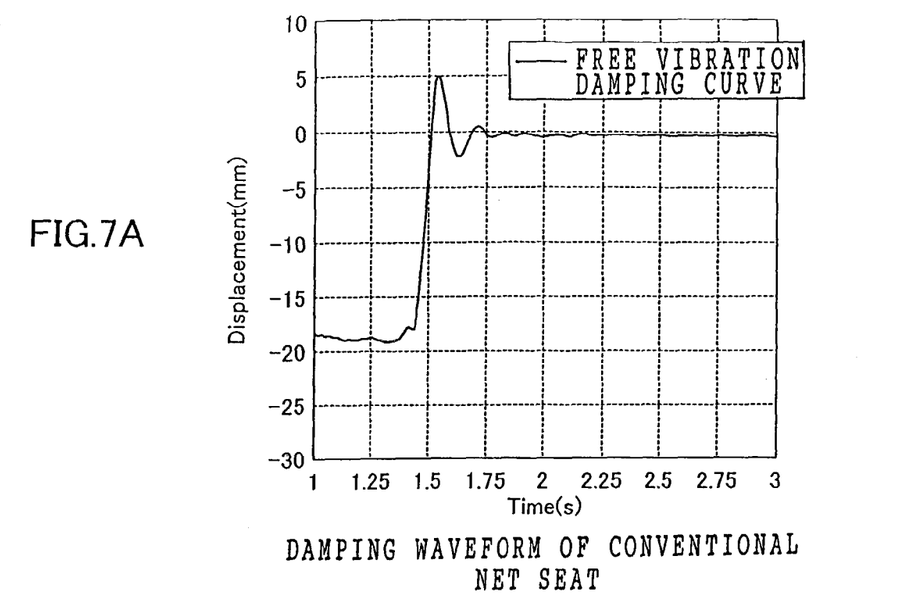
FIG. 7A is a graph showing a damping waveform of a conventional net seat.
Figure 7B:
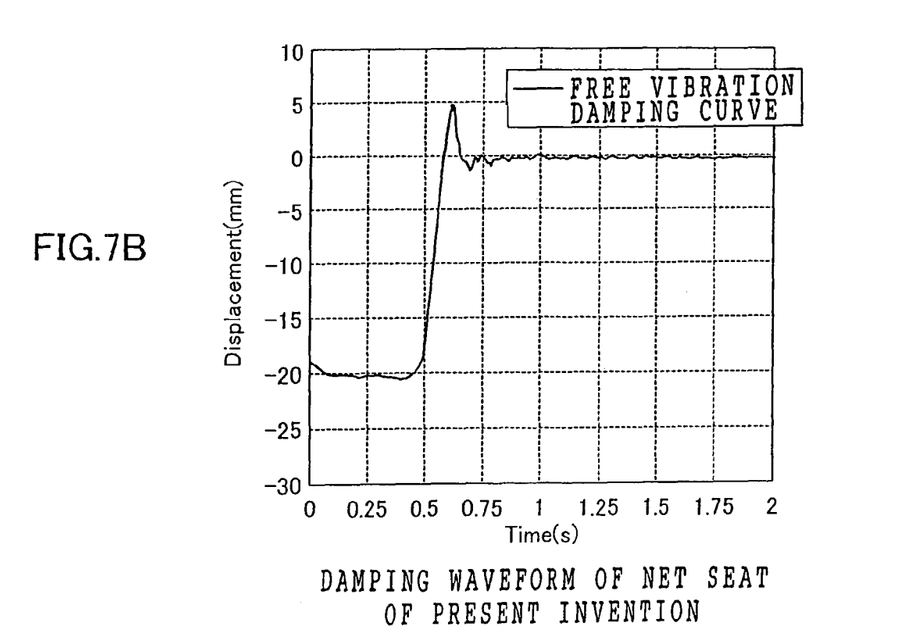
FIG. 7B is a graph showing a damping waveform of a net seat of the embodiment of the present invention.

FIGS. 7A and 7B are graphs showing the measurement of the movement of a deadweight at the time when a conventional net seat using a three-dimensional knitted fabric and a backrest of the net seat of the present embodiment were placed horizontally as cushion materials of a backrest, and thereafter, the deadweight (which was 10 kg) was dropped freely from a height of about 0.02 m onto the lumber support portion. It can be understood from FIGS. 7a and 7B that the net seat of the present embodiment has greater damping after rebounding than the conventional net seat.

As described above, in accordance with the present embodiment, when an automobile receives a large, forwardly-directed impact force due to a rear collision or the like, the impact force applied to the seated occupant can be absorbed by the cushion material of the seat back.

Further, in accordance with the present embodiment, the impact force applied to a seated occupant can be absorbed by the cushion material of the seat back, and the load of the impact force on the seated occupant can be reduced.

What is claimed is:

1. A vehicle seat, comprising:
    a frame;
    a seat connected to said frame and having a seat cushion;
    a backrest connected to said frame and having a backrest cushion that includes a buttocks-contact portion and a shoulder-contact portion; and
    a backrest damping element, wherein
    each of the seat cushion and the backrest cushion comprises a plurality of cells, each of the plurality of cells having a spring element which is configured to be compressed in a pressing direction of the seated occupant and to be extended in a direction opposite to the pressing direction so as to dampen compression and extension of the corresponding cell, and
    the backrest damping element is formed by superposing the seat cushion and backrest cushion to each other by sewing threads or a semi-welded portion, such that the sewing threads break or the semi-welded portion peels apart when a predetermined impact force is applied from the back toward the front, thus causing the buttocks-contact portion to expand and allowing a waist portion of the seated occupant to sink downward, thereby damping the impact force on the seated occupant.

2. A vehicle seat according to claim 1, wherein the backrest damping element is configured such that a damping ratio in the pressing direction of the cushion material of the backrest changes by 0.1 or more before and after the reaction against the impact force.

3. A vehicle seat according to claim 2, wherein the backrest damping element is configured such that the damping ratio in the pressing direction of the cushion material of the backrest changes by 0.6 or less before and after the reaction against the impact force.

4. A vehicle seat according to claim 1, wherein backrest damping element is configured such that a damping ratio in the pressing direction of the cushion material of the backrest changes by 0.2 or more and 0.6 or less before and after the reaction against the impact force.

5. A vehicle seat according to claim 1, wherein the backrest damping element is configured by increasing flexure of the backrest due to the reaction against the impact force.

6. A vehicle seat according to claim 5, wherein the flexure of the backrest is increased by plastically deforming the backrest due to the reaction against the impact force.

7. A vehicle seat according to claim 1, wherein the plurality of cells are arranged in a lattice form.

8. A vehicle seat according to claim 7, wherein the plurality of cells includes a plurality of first cells of a first size, and a plurality of second cells of a second size which is greater than the first size.

9. A vehicle seat according to claim 1, wherein a structure of the cushion material is a three-dimensional mesh structure.

10. A vehicle seat according to claim 9, wherein the structure of the cushion material is formed by:
    a pair of knit fabrics disposed so as to be separate from one another; and
    a pile portion formed by a plurality of connecting threads which join the pair of knit fabrics.

11. A vehicle seat according to claim 10, wherein, one of the pair of knit fabrics has a plurality of flat oval holes arranged in a lattice form, and a plurality of first cells having a first size and a plurality of second cells having a second size greater than the first size are formed in a lattice form among the holes.

12. A vehicle seat according to claim 1, further comprising:
    a head rest; and
    a headrest damping element formed by superposing the headrest and backrest cushion to each other by sewing threads or a semi-welded portion, such that the sewing threads break or the semi-welded portion peels apart when an impact force is applied from the back toward the front causing the shoulder-contact portion to expand.

13. A vehicle seat according to claim 1, the backrest damping element comprising:
   a connecting member connecting a rear end portion of the seat cushion with a lower end portion of the backrest cushion; and
   a shaft and corresponding support unit connected to a point where the seat cushion and backrest cushion are superposed.

* * * * *